Sept. 2, 1952  F. M. WILLIAMSON  2,608,708
WIPER ARRANGEMENT FOR MIRRORS AND THE LIKE
Filed April 23, 1947
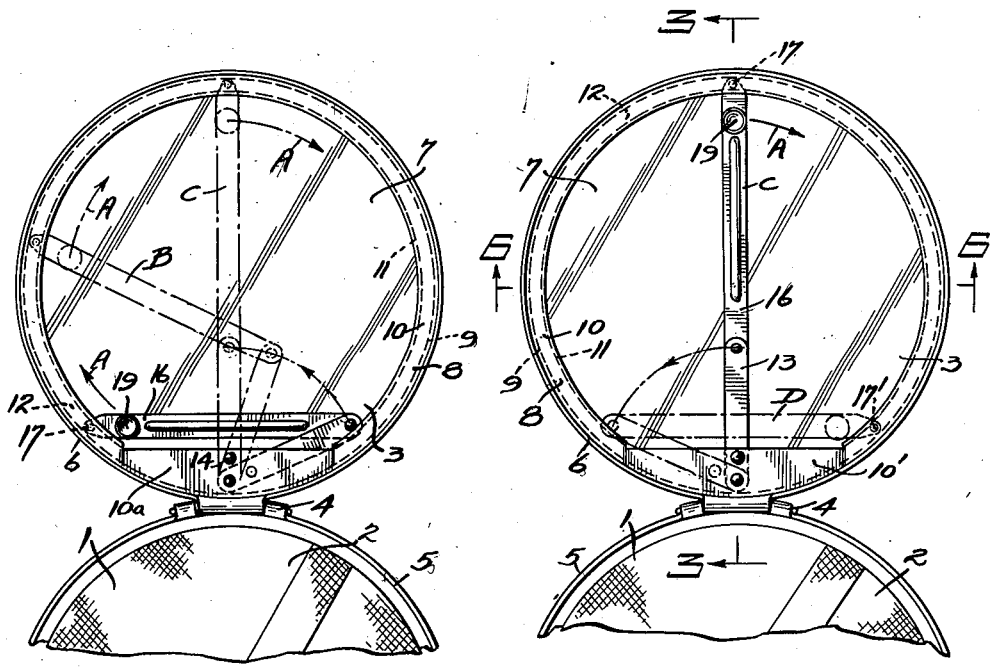
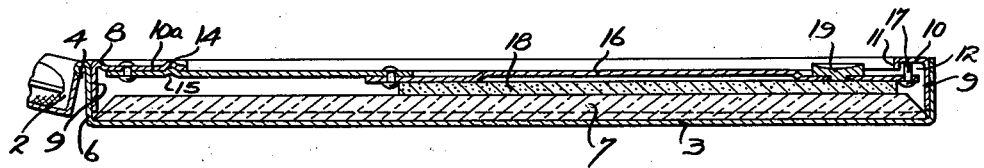
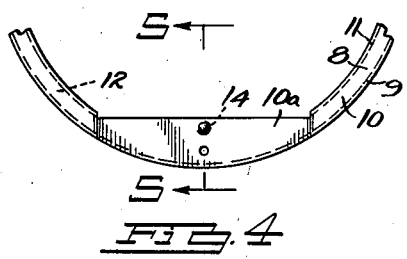
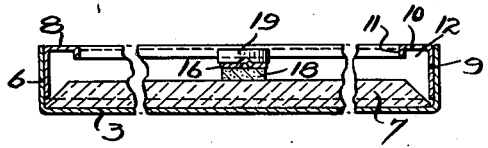
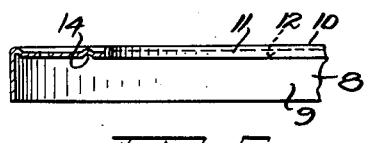
INVENTOR
FLOYD M. WILLIAMSON
BY
Gerald S. Baldwin
ATTORNEY Patented Sept. 2, 1952

2,608,708

UNITED STATES PATENT OFFICE 2,608,708

WIPER ARRANGEMENT FOR MIRRORS AND THE LIKE

Floyd M. Williamson, Detroit, Mich.

Application April 23, 1947, Serial No. 743,426

5 Claims. (Cl. 15—255)

This invention relates to improvements in wiper arrangements for mirrors and the like.

It is an object of the invention to provide a wiper arrangement including a mirror, an arm pivoted adjacent the margin of the mirror, a second arm pivoted on the first one, and a wiping element carried by at least one of the arms so that as the latter are moved along a guided path substantially the entire surface of the mirror is wiped.

Another object of the invention is to provide such a wiper arrangement case wherein the arms are so arranged that when their movement in either direction is completed only a very small portion of the mirror is obstructed.

A further object of the invention is to provide such a wiping arrangement wherein an annular member is provided around the mirror to which one extremity of one of the arms is pivoted, and wherein a guideway is formed around a portion of the said member along which a pin extending from the second arm is slidable to insure movement of both arms along a predetermined course whereby substantially the entire face of the mirror is wiped by wiping means carried by at least one of the arms as the said pin is moved from one extremity of the guideway to the other.

Having thus briefly stated some of the objects and advantages of the invention I will now describe some preferred embodiments thereof with the aid of the accompanying drawing, in which:

Figure 1 is a plan view of a portion of a vanity case open showing the mirror mounted therein and the wiping means therefor.

Figure 2 is a view similar to Figure 1 but with the wiping means moved to a different position over the mirror.

Figure 3 is an enlarged section on the line 3—3 of Figure 2.

Figure 4 is a detail showing a portion of the guide member, and

Figure 5 is an enlarged section on the line 5—5 of Figure 4.

Figure 6 is a section on the line 6—6 of Figure 2.

Referring first to Figures 1 to 6 inclusive, I designates a circular vanity case or compact having a casing 2 and cover 3 which are hingedly connected at 4, and formed around their margins are forwardly projecting annular flanges 5 and 6 respectively which engage one another when the vanity case is closed. Adhesively secured to the inner face of the cover 3 is a mirror 7, and mounted within the annular flange 6 is an annular guide member 8. The latter includes a circular flange 9 which bears against and is suitably secured to the inner face of the flange 6, a retainer 10 which extends inwardly from and at right angles to the flange 9, substantially flush with the outer edge of the flange 6, and around the greater portion of its diameter the inner edge of the retainer is folded parallel with the flange 9 toward the mirror 7 to form a shallow stop 11. Thus around the greater portion of the circumference of the casing the flange 9, retainer 10 and stop 11 form a guideway 12. A segmental portion of the guide member 8 connecting the extremities of the guideway 12 is of angle section and consists merely of the flange 9 and a retainer portion 10' of greater width than the retainer 10 and straight across its inner margin. Pivotally mounted on and beneath the retainer portion 10' adjacent the flange 9 and substantially centrally between the ends of the guideway 12 is one extremity of an arm 13. Formed in the inner face of the retainer portion 10' between the pivot mounting of the arm 13 and the axis of the cover 3 is a depression 14 to engage a corresponding projection 15 formed on the arm 13 which is somewhat resilient. Pivoted on the opposite extremity of the arm 13 is a second arm 16 having a pin 17 extending through its outer extremity and in engagement with the guideway 12, which tends to force the somewhat resilient arm 16 against the mirror 7. Secured along the under face of the arm 16 in contact with the mirror 7 is a wiping element 18 which usually consists of felt or chamois. In this instance the arm 16 is longer than the arm 13 and has an outwardly projecting knob 19 secured thereto adjacent the pin 17. It will be seen in Figure 1 that practically the entire face of the mirror 7 within the guide member 8 is exposed; that the arm 13 lies very largely beneath the retainer portion 10', and that the second arm 16 lies substantially parallel with the inner margin of the said retainer portion and adjacent thereto. By moving the arm 16 so that the pin 17 travels around the guideway 12 in a clockwise direction, as indicated by the arrows A in Figures 1 and 2, through the positions indicated at B and C to its position indicated at D in Figure 2, the entire exposed portion of the mirror 7 is wiped by the wiping element 18. Moreover upon arrival of the arms 13 and 16 at their positions indicated at D they are again beneath or adjacent the retainer portion 10'.

The purpose of the coacting depression 14 and projection 15 is to tend to retain the arm 13 in its position shown in Figure 2 when the two arms 13 and 16 are in alignment and extend diametrically across the mirror 7. In that way the arm 13 is held against movement about its pivotal connection with the arm 16 until the latter is moved sufficiently to one side or the other of its position shown at C to force the said pivotal connection in the desired direction whereupon disengagement of the projection 15 from the depression 14 occurs. Without the coacting depression 14 and projection 15 it would be possible for the pivotally connected ends of the arm 13 and 16 to swing again to the right instead of to the left as the arm 16 is moved from its position C in a clockwise direction. Should that happen the movement of the pin 17 around the guideway would be stopped long before it reached its position 17' and the arms 13 and 16 would obstruct an appreciable portion of the mirror 7. It will also be noted that the retainer portion 10' exerts inward pressure against the arm 13 and that the stop 11 also exerts inward pressure, that is, toward the mirror, against the arm 16, and since both these arms are somewhat resilient, the wiping element is retained in contact with the mirror 7 at all times.

While in the foregoing the preferred embodiments of the invention have been described and shown, it is understood that further alterations and modifications may be made thereto provided they fall within the scope of the appended claims.

What I claim is:

1. A wiping arrangement for an element including a generally circular frame having said element mounted therein, a guide member extending around the frame, a segmental portion on said guide member and spaced from the element, an arm pivoted at one extremity to the segmental portion and extending between said portion and the element whereby said portion engages and retains the arm in position relative to the element, a second arm pivoted adjacent one of its extremities on the first named arm toward the end of the latter remote from its pivot mounting on the segmental portion, wiping means on at least one of the arms, and means on the extremity of the second arm remote from the first arm in slidable engagement with the guide member for movement along the latter around the frame whereby when said arms are moved substantially the entire surface of the element is adapted to be wiped by the wiping means.

2. A wiping arrangement for an element including a generally circular frame having said element mounted therein, a guide member extending around the frame, a segmental portion on said guide member and spaced from said element, an arm pivoted at one extremity to the segmental portion and extending between said portion and the element whereby said portion engages and retains the arm in position relative to the element, a second arm pivoted adjacent one of its extremities on the first arm toward the end of the latter remote from its pivot mounting on the segmental portion, wiping means on at least one of the arms, means on the extremity of the second arm remote from its pivot mounting on the first arm in slidable engagement with the guide member for movement along the latter around the frame whereby when said arms are moved substantially the entire surface of the element is adapted to be wiped by the wiping means, and coacting interengaging means on the first arm and segmental portion for retaining said first arm stationary during a portion of the travel of the second arm along the guideway.

3. A wiping arrangement for an element including a generally circular frame having said element mounted therein, a guide member extending around the frame, a segmental portion on said guide member and spaced from the element, an arm pivoted at one extremity to the segmental portion, at a point between the ends thereof and extending between said portion and the element, a second arm pivoted adjacent one of its extremities on the first named arm toward the end of the latter remote from its pivot mounting on the segmental portion, wiping means on at least one of the arms, means on the extremity of the second arm remote from the first arm in sliding engagement with the guide member for movement along the latter around the frame, and means on said guide member for engaging with and retaining said second arm in position relative to said element.

4. A wiping arrangement for an element including a generally circular frame having said element mounted therein, a guide member extending around the frame, a substantially flat segmental portion on said guide and spaced from the element, an arm pivoted at one extremity to the segmental portion and extending between said portion and the element, a second arm pivoted adjacent one extremity of the first named arm toward the end of the latter remote from its mounting on the segmental portion, wiping means on the second arm, means on the extremity of the second arm remote from its pivot mounting on the first arm in sliding engagement with the guide member for movement along the latter around the frame whereby when said arms are moved substantially the entire surface of the element is adapted to be wiped by the wiping means, means on the guide member engaging with said member and retaining said wiping element in position relative to the element, and means on one of said arms for moving said arms manually.

5. A wiping arrangement for an element including a generally circular frame having said element mounted therein, a guide member extending around the frame and spaced from the element, a segmental portion on said guide member and spaced from the element, an arm pivoted at one extremity to the segmental portion intermediate the ends thereof and extending between said portion and the element, a second arm pivoted adjacent one of its extremities on the first named arm toward the end of the latter remote form its pivot mounting on the segmental portion, wiping means on at least one of the arms, the outer extremity of said second arm away from its pivot point extending between the guide member and the element and slidably engaging the guide member for movement along the latter around the frame, and means on said guide member and said segmental portion for engaging with the retaining said arms in position relative to said element.

FLOYD M. WILLIAMSON.

REFERENCES CITED

The following references are of record in the file of this patent:

UNITED STATES PATENTS

| Number | Name | Date |
|---|---|---|
| 678,361 | Flammiger | July 16, 1901 |
| 860,021 | Fesenfeld | July 15, 1907 |
| 1,246,829 | McWhirter | Nov. 13, 1917 |
| 1,506,132 | Oishei | Aug. 26, 1924 |
| 2,005,835 | Williamson | June 25, 1935 |
| 2,165,598 | Williamson | July 11, 1939 |
| 2,165,599 | Williamson | July 11, 1939 |